United States Patent
Klyuchevskyy

(10) Patent No.: US 8,132,187 B2
(45) Date of Patent: Mar. 6, 2012

(54) DRIVER INSTALLER USABLE IN PLURAL ENVIRONMENTS

(75) Inventor: Andriy Klyuchevskyy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1160 days.

(21) Appl. No.: 11/897,780

(22) Filed: Aug. 31, 2007

(65) Prior Publication Data
US 2009/0064197 A1    Mar. 5, 2009

(51) Int. Cl.
G06F 9/44      (2006.01)
G06F 9/445    (2006.01)

(52) U.S. Cl. ......... 719/327; 719/321; 717/171; 717/174

(58) Field of Classification Search .................. None
See application file for complete search history.

(56) References Cited

U.S. PATENT DOCUMENTS

| | | |
|---|---|---|
| 6,473,854 B1 | 10/2002 | Fleming, III |
| 6,671,749 B2 | 12/2003 | Williams et al. |
| 6,976,252 B2 | 12/2005 | White et al. |
| 7,089,551 B2 | 8/2006 | Fordemwalt et al. |
| 7,107,330 B1 | 9/2006 | Hamilton, II et al. |
| 2003/0023770 A1 | 1/2003 | Barmettler et al. |
| 2003/0046674 A1* | 3/2003 | Gentry et al. ................. 717/171 |
| 2003/0051012 A1 | 3/2003 | Chen |
| 2003/0131149 A1* | 7/2003 | Sugiura ......................... 709/321 |
| 2004/0230988 A1 | 11/2004 | Stokes et al. |
| 2005/0028172 A1* | 2/2005 | Yoshikawa et al. ............ 719/321 |
| 2005/0160157 A1 | 7/2005 | Collier et al. |
| 2006/0168372 A1* | 7/2006 | Smith et al. ..................... 710/62 |
| 2008/0209193 A1* | 8/2008 | Zhang et al. ..................... 713/1 |

OTHER PUBLICATIONS

"Device Installation Evolution: Driver Install Frameworks Tools", Date: Nov. 2004, pp. 1-4.
"Driver Install Frameworks Overview Improving Windows Driver Installation", http://www.microsoft.com/whdc/driver/install/difxtools.mspx, retrieved Jun. 20, 2007.
"Driver Installation for 32-bit and 64-bit Platforms", Date: Apr. 6, 2006, pp. 1-10, http://download.microsoft.com/download/5/d/6/5d6eaf2b-7ddf-476b-93dc-7cf0072878e6/32-64bit_install.doc.
Russinovich, Mark, "Multi-platform Images", in "Mark's Blog (Mark Russinovich's technical blog covering topics such as Windows troubleshooting, technologies and security)", dated: Sep. 19, 2005, retrieved at <<http://blogs.technet.com/markrussinovich/archive/2005/09/19/multi-platform-images.aspx>>, pp. 1-15.

* cited by examiner

*Primary Examiner* — Lechi Truong
*Assistant Examiner* — Tuan Dao

(57) ABSTRACT

An executable file can be constructed that contains different driver installer code for use in different environments. A first executable file contains first program code that performs driver installation operations in a first environment, and that also checks to determine which environment the first program code is running in. If the first program code is running in the first environment, then the driver installation operations proceed using the first program code. If the first program code is running in a second environment, then second program code, which performs the driver installation operations in a second environment, is extracted from a resource in the first executable file. The second program code is copied into a second executable file. The second executable file is then invoked to perform the driver installation operations in the second environment.

18 Claims, 5 Drawing Sheets

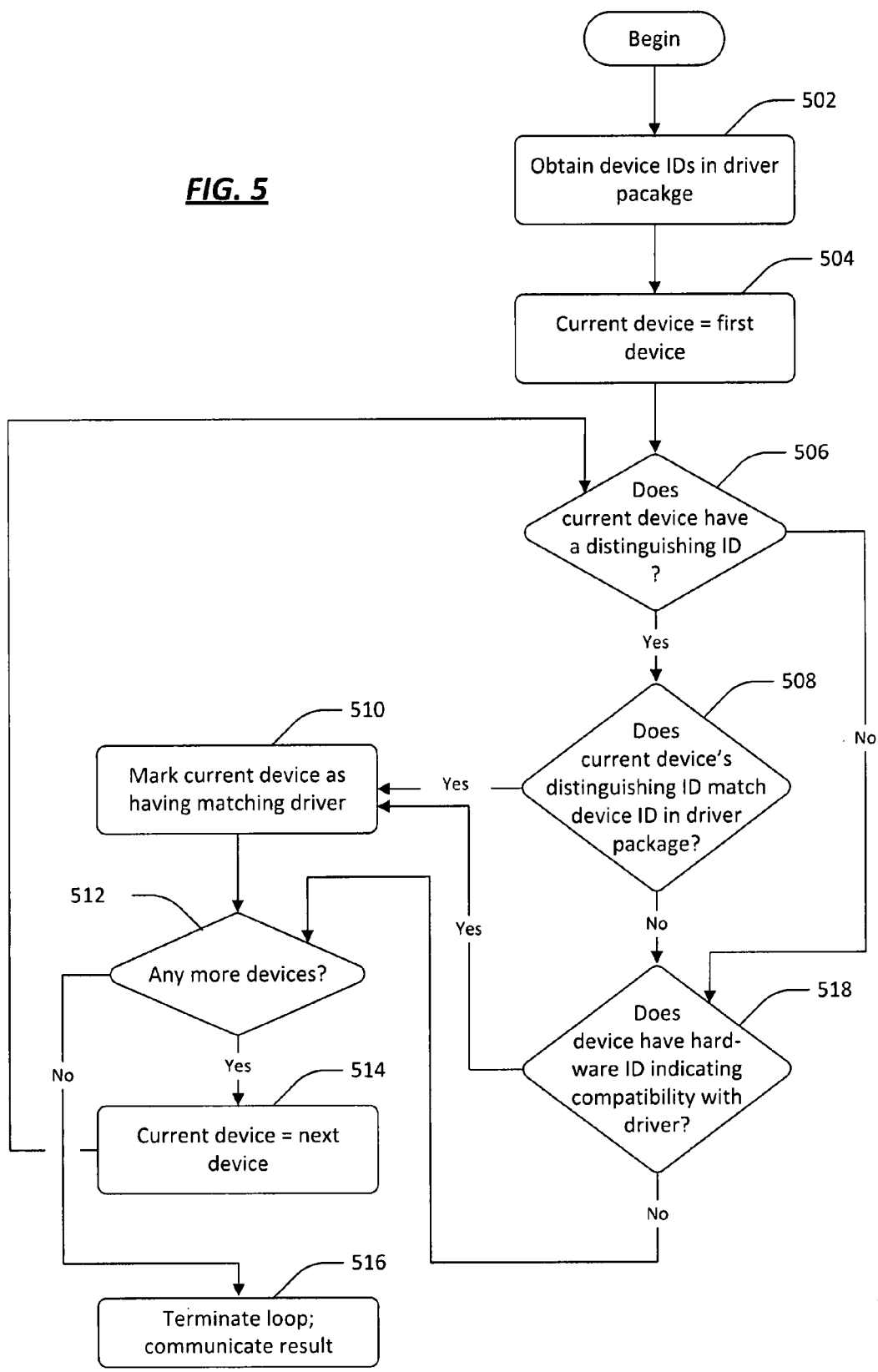

DRIVER INSTALLER USABLE IN PLURAL ENVIRONMENTS

BACKGROUND

A device driver is a program that controls a device, such as a hardware component of a computer, or a peripheral device attached to a computer. The driver is typically installed so as to become bound with the operating system of the computer to which the device is connected. The installation is done by a driver installer, which takes a driver program from a driver package and installs it for use with the operating system.

The specifics of the installation process may be based, to some degree, on aspects of the target installation environment. For example, the driver installation process may be different for different operating systems, or for different versions of an operating system (e.g., the process could be different for the 32-bit and 64-bit versions of the WINDOWS operating system), or for different underlying processors. Thus, different driver installers may be used for different target environments, so that the driver installer can take specifics of the target environment into account in the installation process.

Additionally, people who install drivers may sometimes wish to determine which devices are supported in a particular driver package before performing the installation.

SUMMARY

A driver installer can be constructed that supports two or more different target installation environments. A driver installer program is created, and the program performs operations such as driver installation, driver preview, etc. A first unit code that implements the driver installer's operations for a first environment is stored in a first executable file. Additionally, a second unit of code that implements the driver installer's operations for a second environment is stored as a resource within the first executable file.

When the driver installer runs, it may determine which environment it is running in. If the driver installer is running in the first environment, then it proceeds to perform operations such as driver installation, driver preview, etc. If the driver installer is running in the second environment, then the driver installer copies the second unit of code from the resource into a second executable file, and then causes the second executable file to be executed. Thus, one executable file (the first executable file) can contain driver installer programs for two environments. Similarly, driver installers for any number of environments could be stored as resources within the first executable file, thereby allowing the executable file to serve any number of environments.

One operation that can be performed by a driver installer is a driver preview. The driver installer program can examine drivers contained in a driver package, by trying to match the distinguishing identifiers specified by the drivers in the package with those of the devices present at the machine. If a device does not provide a distinguishing identifier that can be matched against the driver, then a driver in the package can be matched to a device by comparing the driver's identifier with hardware compatibility information stored in the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 is a flow diagram of a process of previewing drivers.

DETAILED DESCRIPTION

Figure 1:
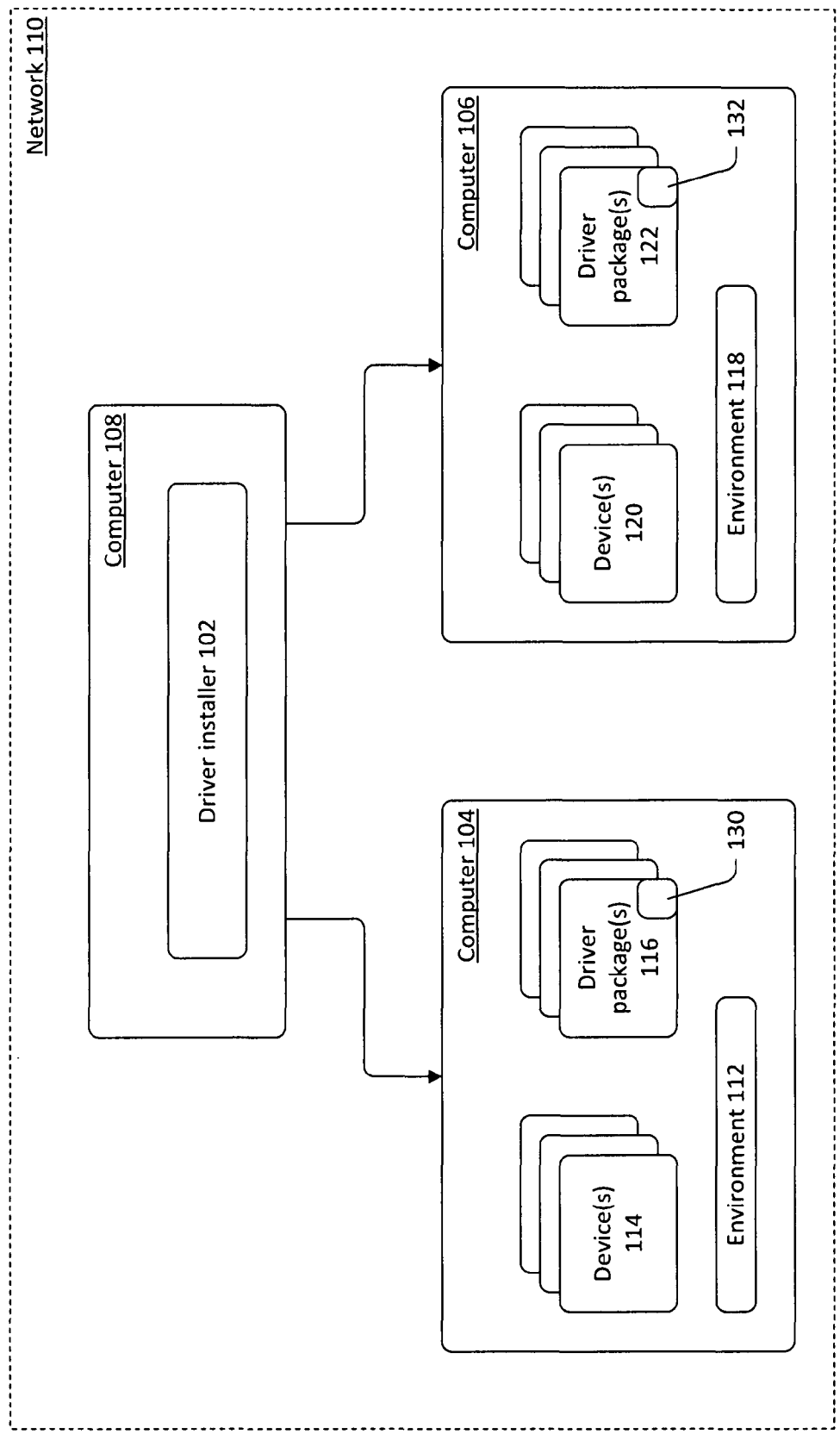
FIG. 1 is a block diagram of computers, and of an example driver installer that is used to install drivers on the computers.

When a device driver is installed, the driver becomes part of, or bound with, the operating system. A driver is normally provided in the form of a driver package. A driver installer is used to take the driver program contained in the package and install it in (or for use with) the operating system such that the operating system can use the driver to control a device. The nature of the installation process is such that the process may be specific to particular aspects of the target environment in which the driver is to be installed, such as the hardware architecture that is present, or the operating system (or the version of the operating system). For example, driver installation may be different for the 32-bit and 64-bit versions of the WINDOWS operating system. Environments can be constructed with cross-platform compatibility, so it may be possible to run, for example, a 32-bit program on a 64-bit processor or on a 64-bit version of an operating system; or it may be possible to run a program built for one operating system on another operating system. However, due to the hardware- and platform-specific nature of driver installation, it may be the case that a driver installer designed for the specific target environment should be used, even if driver installer code for a different environment can theoretically be executed in the target environment.

Different driver installers can be used to accommodate the different target installation environments. Normally, the person who installs the driver selects the appropriate driver installer for an environment. However, it is possible to construct a driver installer executable that works in different environments. The executable contains code to perform various operations (e.g., installation of drivers, preview of drivers, etc.), and also to check which environment the executable is running in. The executable also contains one or more resources, which contain versions of the driver installer code for one or more other environments. If the executable is running in the environment for which it is intended, then it performs the various operations of installation, preview, etc. On the other hand, if the executable detects that it is running in a different environment, then it obtains the version of the driver installer for that environment from one of the resources, and copies the code for that version into a file. The file is then executed. Thus, driver installers for several different environments can be packaged in one executable, and the executable can select and execute the proper version.

Additionally, the executable can provide a driver preview operation, which can indicate which driver(s) in the package pertain to a device on the machine. The preview operation determines what device identifiers are indicated in the driver package, and then canvasses the machine to determine what devices are available and their corresponding device identifier or hardware compatibility identifiers. Devices are supposed to specify a distinguishing identifier that can be matched against an identifier in the driver, thereby allowing a particular device to be paired with a particular driver. However, for some devices, the distinguishing identifier is difficult to get, or is otherwise not available, so other information (such as a hardware compatibility identifier) can be used to determine whether a given driver probably or possibly will work with the device. Devices are compared with drivers in a package based on available identifiers, and the preview operation indicates which device(s) the driver package contains drivers for. The result of this preview operation can be communicated to a user, an administrator, or another person.

Referring now to the drawings, FIG. 1 shows a driver installer that can be used to install a driver. Driver installer 102 is a program that may be used to install drivers on a plurality of computers, such as computers 104 and 106. In one example, computer 108 (on which driver installer 102 may be stored) is used to direct the installation of drivers on other computers. For example, computers 104, 106, and 108 may exist together in a network 110, in which case driver installer 102 may be stored on computer 108, and computer 108 may copy driver installer 102 to computers 104 and/or 106 in order to cause the installation of a driver on computers 104 and 106. Network 110 could be a local network for a corporation or other type of organization, or the Internet, or any other kind of network. While FIG. 1 shows a scenario in which driver installer is located on computer 108 and is copied to computers 104 and 106, driver installer may be located on any computer and/or may be copied to any computer. For example, driver installer 102 could be delivered with, or as part of, an operating system for computers 104 and/or 106.

Each of computers 104 and 106 has particular environment, and a particular set of devices and driver packages. Computer 104 has environment 112, one or more device(s) 114, and one or more driver package(s) 116. Computer 106 has environment 118, one or more device(s) 120, and one or more driver package(s) 122. The environment 112 and 118 that are present on computers 104 and 106, respectively, may be the same as each other, but may also be different from each other. For example, environments 112 and 118 may be based on the 32-bit and 64-bit versions, respectively, of the x86 processor architecture. As another example, environment 112 could be based on an x86 architecture and environment 118 could be based on a POWERPC architecture. As a further example, the nature of an environment could be based on the operating system present at the computer—e.g., environments 112 and 118 could be the 32-bit and 64-bit versions of the WINDOWS operating system, respectively, or one could be a WINDOWS operating system and another could be a version of Linux. (The 32-bit version of the WINDOWS operating system can run on a 64-bit machine, so the designated bit-size of the machine's architecture, and the designated bit-size of the operating system, are not necessarily the same thing.) In greater generality, there could be any number of computers having any number or variety of different environments.

Each of computers 104 and 106 has one or more devices. Computer 104 has device(s) 114, and computer 106 has device(s) 120. Devices can be any type of hardware, such as a video card, a sound card, a disk controller, a monitor, a pointing device, etc.

Additionally, each of computers 104 and 106 has one or more driver packages. Computer 104 has driver package(s) 116 (which may contain one or more drivers, such as driver 130), and computer 106 has driver package(s) 122 (which may contain one or more drivers, such as driver 132). Driver packages contain drivers for various types of devices, and these drivers can be installed from the driver packages. There is a distinction between a driver package and an installed driver. A driver typically is delivered to a computer in the form of a driver package, which contains the code for the driver. Drivers in the packages may be installed for use on a particular machine. It is typical for an operating system to come with many driver packages to support many different devices, and particular drivers from these packages can be selected for installation based on what devices are installed or attached to the computer. As one example, a driver package may contain an information (.INF) file that specifies driver files, registry entries, device identifiers, catalog files, and version information that is used install the driver. In versions of the WINDOWS operating system, driver packages typically come with .INF files, although a driver package can take any form. In some scenarios, a user can click on an icon that represents a .INF file to install a driver. However, as another example scenario, a driver installer program, such as driver installer 102, may be used to guide or direct the process of installing a driver.

The differences between environments 112 and 118 may be such that different driver installers are used in these different environments. It is possible for different driver installer executables to be used in environments 112 and 118. However, a single driver installer executable may be implemented that can be used on plural environments, and FIG. 2 shows an example of such a driver installer executable.

Figure 2:
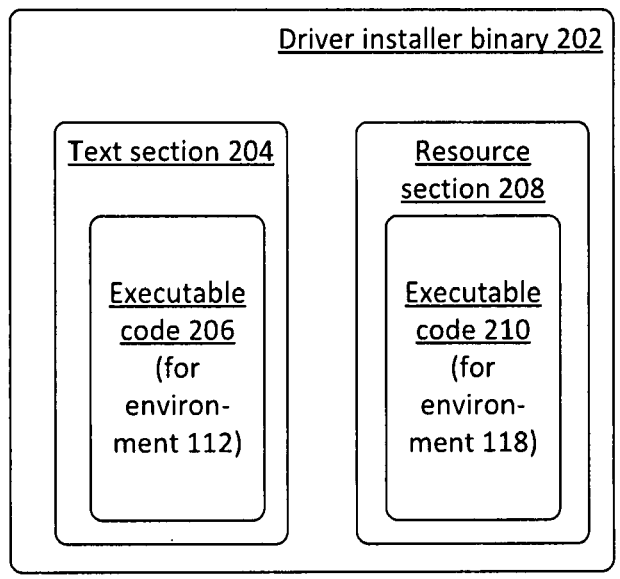
FIG. 2 is a block diagram of an example binary that can be used to implement the driver installer of FIG. 1.

In FIG. 2, driver installer binary 202 has the form of an executable component. The executable component may be an executable file such as a file in Portable Executable (PE) format. However, any type of executable component in any format may be used, such as an executable object, or an executable file in a different format (e.g., Preferred Executable Format, Universal Binary, etc.).

Driver installer binary 202 has a text section 204, which stores executable code 206 for use in a first environment (such as environment 112). Additionally, driver installer binary 202 has a resource section 208 that contains resources that may be accessed by the executable code stored in text section 204. One of the resources stored in resource section 208 is executable code 210 for use in a second environment (such as environment 118).

Executable code 206 implements driver installer 102 (shown in FIG. 1) in a first environment. Thus, executable code 206 is executable on a first environment (e.g., environment 112), and, when executed, performs operations on that environment such as installing drivers, previewing drivers, and other operations. (Previewing of drivers is described below.) Executable code 210 implements driver installer 102 (shown in FIG. 1) in a second environment, and when executed performs operations like those of executable code 206, such as installing drivers, previewing drivers, etc.

Additionally, executable code 206 performs an operation to determine which environment it is running in (e.g., environment 112 or environment 118). If it is running on environment 118, then executable code 206 performs operations to extract executable code 210 from resource section 208, to copy executable code 210 into a file, to build a command line, and to run executable code 210 as the driver installer. For example, suppose that environments 112 and 118 are the 32-bit and 64-bit versions, respectively, of the x86 architecture. The 64-bit version of the x86 architecture supports backward compatibility to the 32-bit version, so executable code 206 (which, in this example, is an executable for the 32-bit version) will run on either architecture. However, there may be reasons to use a 64-bit version of the driver installer code (i.e., executable code 210) when using 64-bit hardware. The subject matter described herein can be used to run a version of the driver installer that is appropriate for the underlying hardware. Processes are described below to select and run the appropriate driver installer code.

Figure 4:
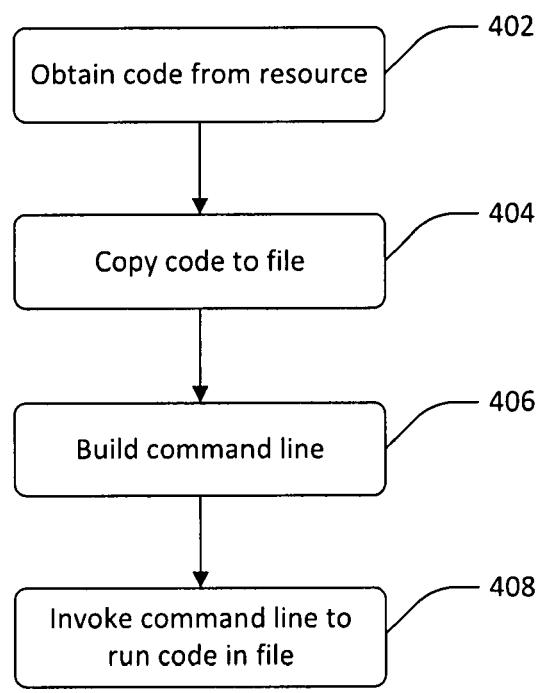
FIG. 4 is a flow diagram of a process of using a first binary that is stored as a resource within a second binary.
Figure 3:
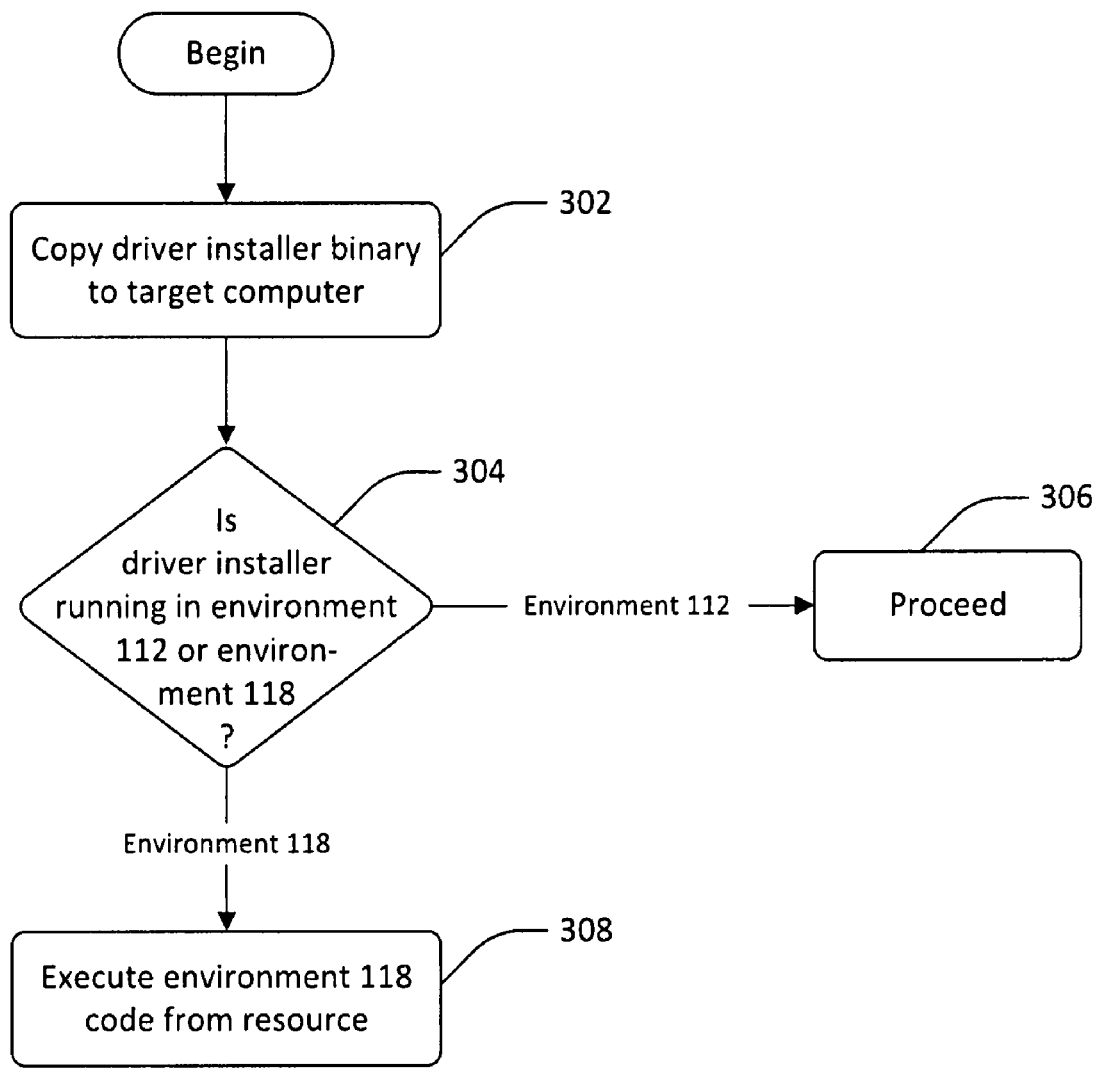
FIG. 3 is a flow diagram of a process of using a driver installer binary.

FIGS. 3-5 show various processes. Before turning to these processes, it should be noted that these processes are described, by way of example, with reference to components shown in FIGS. 1-2; however, these processes may be carried out in any system and are not limited to the scenarios shown in FIG. 1-2. Additionally, each of the flow diagrams in FIGS. 1-2 shows an example in which stages of a process are carried out in a particular order, as indicated by the lines connecting the blocks, but the various stages shown in these diagrams can be performed in any order, or in any combination or subcombination.

Referring now to FIG. 3, there is shown a process of using the driver installer binary 202 that is shown in FIG. 2. At 302, the driver installer binary is copied to a target computer and is received by that target computer. For example, computer 108 (shown in FIG. 1) may maintain a copy of the driver installer binary, and computer 108 may copy that binary onto a computer (such as computer 104 or computer 106, both shown in FIG. 1) onto which the driver installer binary is to be used. It is then determined (at 304) which environment the driver installer binary is running in. In the example of FIG. 3, the driver installer binary that was copied at 302 is a binary for environment 112. If the driver installer binary determines that it is running on a computer that has environment 112, then the driver installer binary proceeds (at 306) to perform its various operations. One example of such an operation is to install a driver (which could be performed by any mechanism, such as through a driver installation Application Programming Interface (API)). Another example is to perform a driver preview, by communicating or displaying information, such as the device to which a given driver relates. (Driver preview can also result in communicating or displaying an indication that there is a lack of match between a driver and a device on the machine).

If it is determined at 304 that the driver installer binary is running in a different environment (e.g., environment 118), then code that implements the driver installer for the other environment is obtained or retrieved from a resource and is then executed (at 308). For example, with reference to the components shown in FIG. 2, if driver installer binary 202 (which is for environment 112) determines that it is running on environment 118, then driver installer binary causes executable code 210 to be obtained from resource section 208, and then causes the executable code to be executed.

FIG. 4 shows a particular way of performing block 308 of FIG. 3. At 402, executable code that implements a driver installer for a particular environment (e.g., environment 118) is obtained from a resource. At 404, the code for the resource is copied into a file. At 406, a command line is built that refers to the file. At 408, the command line is invoked, so that the program contained in the file can be run. After the code in the file has been run, the file can be deleted.

One operation that can be performed by a driver installer is to provide a driver preview. A preview can be used to determine which devices on a given machine the drivers in a package might relate to. Devices generally have distinguishing identifiers (IDs). If a driver for a device specifies the same distinguishing ID as the device, then it can be determined that a driver matches a particular device simply by matching the distinguishing ID in the driver with the distinguishing ID in the device. However, sometimes devices and drivers cannot be matched by their distinguishing IDs, so a probable (or possible) match between a device and a driver can be determined by comparing an available ID for the device (e.g., a hardware ID, a compatibility ID, etc.) with the device ID(s) from the driver package. In general, the determination that there is compatibility between a driver and device can be based on crisply resolving information that is otherwise fuzzy. Thus, a determination that there is a match could mean that a match is certain (e.g., if an identifier in the driver is identical to an identifier in the device), but could also mean that a match has been found to exist with some level of likelihood, probability, or possibility.

FIG. 5 shows an example process of performing a driver preview that determines which drivers in a package pertain to which devices on a machine.

At 502, the driver package is examined to obtain the device IDs for the drivers contained in the package. Then, for a machine on which drivers are to be previewed, the set of devices on the machine is stepped through to determine which driver(s) match those devices. To step through the devices, at 504 the "current device" is set to a particular device on the machine (a "first device"), and 506-516 constitute a loop that determines whether the package contains a driver for the current device, and then sets the "current device" to the next device on the machine, until there are no more devices to consider.

At 506, it is determined whether the current device has an accessible distinguishing ID. If the current device has an accessible distinguishing ID, then it is determined (at 508) whether the device's distinguishing ID matches a device ID in the driver package. If the current device's distinguishing ID matches a device ID in the driver package, then the driver is marked as matching the device (at 510). If there are more devices on the machine (as determined at 512), then the current device is set to the next device (at 514), and the process returns to 506. If it is determined at 512 that there is not another device on the machine, then the loop terminates and the results of the driver preview process (e.g., the list of devices that the package contains drivers for) is communicated (at 516). One example of such communication is that a user, an administrator, or other person, can be provided with a list of devices on the machine that have compatible (or potentially compatible) drivers in the package.

If it was determined at 508 that the current device's distinguishing ID does not match a device ID in the driver package, or if it was determined at 506 that the device does not have an accessible distinguishing ID, then the process proceeds to 518, where a determination is made as to whether the current device has one or more hardware IDs indicating compatibility with the driver(s) in the package. For example, the device IDs in the package may not match distinguishing IDs of the devices, but they may indicate compatibility with certain types of hardware and/or hardware features. If such compatibility is found to exist, then the process proceeds to (510), where the driver is marked as matching the device, and the process proceeds from 510 as described above. If it is not determined at 518 that the current device is compatible with the driver(s) in the package, then the process proceeds to 512 to determine whether there is another device to consider on the machine, and the process proceeds from 512 as described above.

Figure 6:
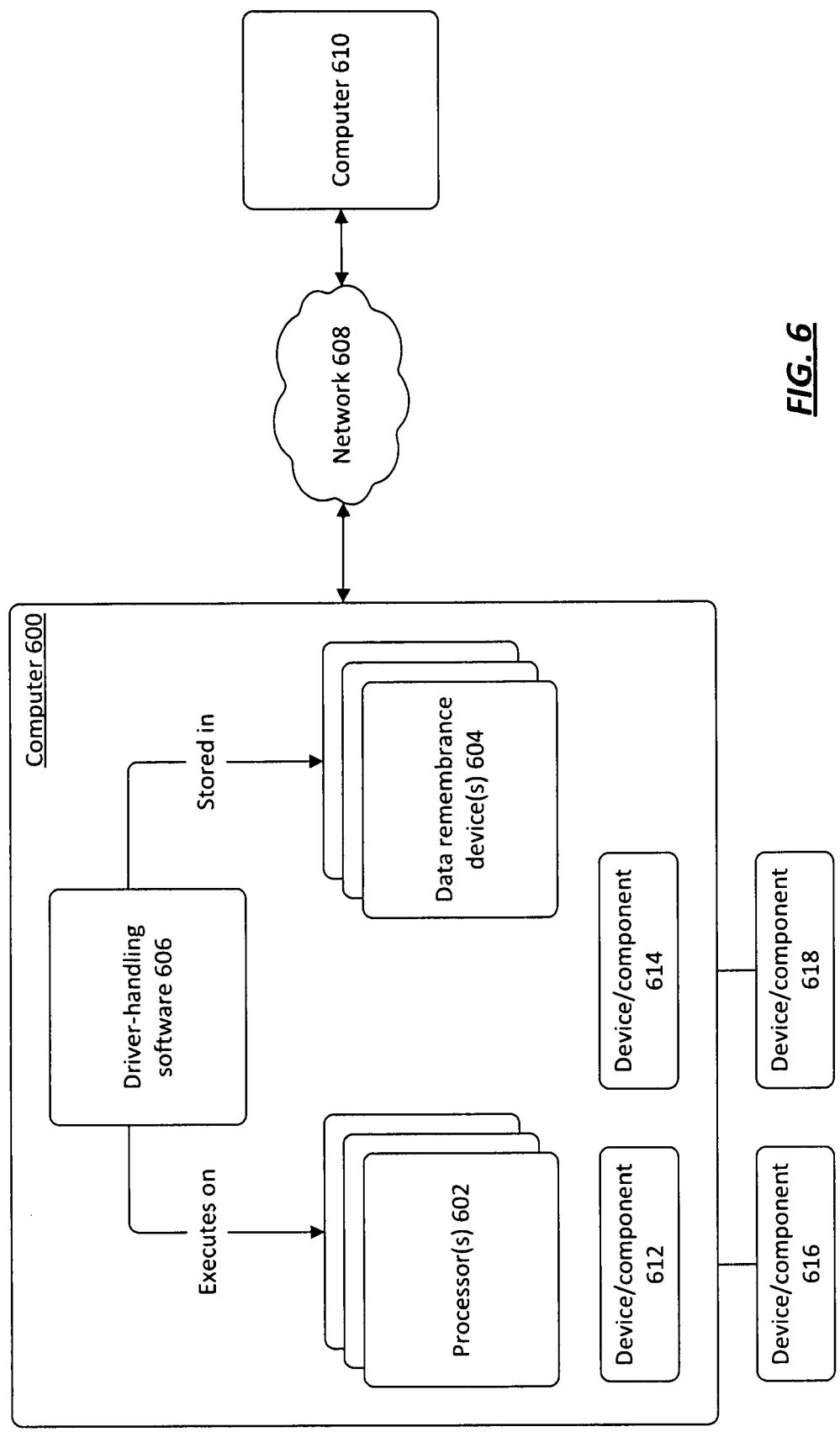
FIG. 6 is a block diagram of example components that may be used with implementations of the subject matter described herein.

FIG. 6 shows an example environment in which aspects of the subject matter described herein may be deployed.

Computer 600 includes one or more processors 602 and one or more data remembrance devices 604. Processor(s) 602 are typically microprocessors, such as those found in a personal desktop or laptop computer, a server, a handheld computer, or another kind of computing device. Data remembrance device(s) 604 are devices that are capable of storing data for either the short or long term. Examples of data remembrance device(s) 604 include hard disks, removable disks (including optical and magnetic disks), volatile and non-volatile random-access memory (RAM), read-only memory (ROM), flash memory, magnetic tape, etc. Data remembrance device(s) are examples of computer-readable storage media. Computer 600 may comprise, or be associated with, devices 612, 614, 616, and 618 (which may also be referred to as "components"). These devices can be any type of device, such as a sound card, video card, disk controller, etc. These devices can be within computer 600 (as in the example of devices 612 and 614), or can be located outside of computer 600 and communicatively connected to computer 600 in some manner (as in the examples of devices 616 and 618).

Software may be stored in the data remembrance device(s) 604, and may execute on the one or more processor(s) 602. An example of such software is driver-handling software 606, which may implement some or all of the functionality described above in connection with FIGS. 1-5. A personal computer in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance device(s) 604 and that executes on one or more of the processor(s) 602. As another example, the subject matter can be implemented as software having instructions to perform one or more acts of a process, method, etc., where the instructions are stored on one or more computer-readable storage media.

In one example environment, computer 600 may be communicatively connected to one or more other devices through network 608. Computer 610, which may be similar in structure to computer 600, is an example of a device that can be connected to computer 600, although other types of devices (such as devices 612 through 618, as discussed above) may also be so connected.

Although the subject matter has been described in language specific to structural features and/or methodological acts, it is to be understood that the subject matter defined in the appended claims is not necessarily limited to the specific features or acts described above. Rather,.the specific features and acts described above are disclosed as example forms of implementing the claims.

The invention claimed is:

1. A method of installing a driver that is stored in a package, the method comprising:
  receiving a first file that comprises: (a) first code that implements a driver installer that is usable in a first environment, and (b) a resource that comprises second code that implements said driver installer, said second code being usable in a second environment;
  invoking execution of said first file;
  determining that said first code is executing in said second environment;
  based on said determining, copying said second code into a second file and invoking execution of said second file;
  doing at least one of:
    (a) installing the driver, and
    (b) communicating or displaying at least one of (b1) an indication of a device to which the driver relates, or (b2) information indicating a lack of match between the driver and said device;
  obtaining, from the package, a first identifier associated with the driver;
  comparing said first identifier with a second identifier that distinguishes the device;
  determining that said second identifier is not identical to said first identifier;
  based on having determined that said second identifier is not identical with said first identifier, subsequently comparing said first identifier with a third identifier that does not distinguish said device but that identifies a hardware feature of said device; and
  based on the subsequent comparing of said first identifier with said third identifier, determining whether the device matches the driver.

2. The method of claim 1, wherein said first environment comprises a first operating system, wherein said second environment comprises a second operating system, and wherein said second operating system supports execution of programs that are executable in said first operating system.

3. The method of claim 1, wherein said first environment comprises an m-bit architecture, wherein said second environment comprises an n-bit architecture that supports execution of m-bit code and n-bit code, and wherein n is greater than m.

4. The method of claim 1, further comprising:
  building a command line;
wherein said invoking of execution of said second file comprises invoking said command line.

5. The method of claim 1, further comprising:
  at a point in time after at least (a) has occurred, deleting said second file.

6. The method of claim 1, said first file being received from a first machine that directs the installation of drivers on other machines, said other machines including a second machine on which the method is performed.

7. One or more computer-readable storage media comprising executable instructions to perform a method of installing a driver that is stored in a package, the method:
  receiving a first file that comprises: (a) first code that implements a driver installer that is usable in a first environment, and (b) a resource that comprises second code that implements said driver installer, said second code being usable in a second environment;
  invoking execution of said first file;
  determining that said first code is executing in said second environment;
  based on said determining, copying said second code into a second file and invoking execution of said second file;
  doing at least one of:
    (a) installing the driver, and
    (b) communicating or displaying at least one of (b1) an indication of a device to which the driver relates, or (b2) information indicating a lack of match between the driver and said device;
  obtaining, from the package, a first identifier associated with the driver;
  comparing said first identifier with a second identifier that distinguishes the device;
  determining that said second identifier is not identical to said first identifier;
  based on having determined that said second identifier is not identical with said first identifier, subsequently comparing said first identifier with a third identifier that does not distinguish said device but that identifies a hardware feature of said device; and
  based on the subsequent comparing of said first identifier with said third identifier, determining whether the device matches the driver.

8. The one or more computer-readable storage media of claim 7, wherein said first environment comprises a first operating system, wherein said second environment comprises a second operating system, and wherein said second operating system supports execution of programs that are executable in said first operating system.

9. The one or more computer-readable storage media of claim 7, wherein said first environment comprises an m-bit architecture, wherein said second environment comprises an n-bit architecture that supports execution of m-bit code and n-bit code, and wherein n is greater than m.

10. The one or more computer-readable storage media of claim 7, the method further comprising:
building a command line;
wherein said invoking of execution of said second file comprises invoking said command line.

11. The one or more computer-readable storage media of claim 7, the method further comprising:
at a point in time after at least (a) has occurred, deleting said second file.

12. The one or more computer-readable storage media of claim 7, said first file being received from a first machine that directs the installation of drivers on other machines, said other machines including a second machine on which the method is performed.

13. A system for installing a driver that is stored in a package, the system comprising:
a data remembrance device;
a processor; and
a component that is stored in said data remembrance device, that executes on said processor, and that:
receives a first file that comprises: (a) first code that implements a driver installer that is usable in a first environment, and (b) a resource that comprises second code that implements said driver installer, said second code being usable in a second environment;
invokes execution of said first file;
determines that said first code is executing in said second environment;
based on said determining, copies said second code into a second file and invokes execution of said second file;
does at least one of:
(a) installing the driver, and
(b) communicating or displaying at least one of (b1) an indication of a device to which the driver relates, or (b2) information indicating a lack of match between the driver and said device;
obtains, from the package, a first identifier associated with the driver;
compares said first identifier with a second identifier that distinguishes the device;
determines that said second identifier is not identical to said first identifier;
based on having determined that said second identifier is not identical with said first identifier, subsequently comparing said first identifier with a third identifier that does not distinguish said device but that identifies a hardware feature of said device; and
based on the subsequent comparing of said first identifier with said third identifier, determining whether the device matches the driver.

14. The system of claim 13, wherein said first environment comprises a first operating system, wherein said second environment comprises a second operating system, and wherein said first operating system supports execution of programs that are executable in said first operating system.

15. The system of claim 13, wherein said first environment comprises an m-bit architecture, wherein said second environment comprises an n-bit architecture that supports execution of m-bit code and n-bit code, and wherein n is greater than m.

16. The system of claim 13, said component building a command line, wherein said component's invocation of execution of said second file comprises invoking said command line.

17. The system of claim 13, said component deleting said second file at a point in time after said component has installed the driver.

18. The system of claim 13, said first file being received from a first machine that directs the installation of drivers on other machines, said other machines including a second machine on which the method is performed.

* * * * *

UNITED STATES PATENT AND TRADEMARK OFFICE
CERTIFICATE OF CORRECTION

PATENT NO. : 8,132,187 B2  
APPLICATION NO. : 11/897780  
DATED : March 6, 2012  
INVENTOR(S) : Klyuchevskyy Page 1 of 1

It is certified that error appears in the above-identified patent and that said Letters Patent is hereby corrected as shown below:

In column 10, line 14, in Claim 13, delete "comparing" and insert -- compares --, therefor.

In column 10, line 18, in Claim 13, delete "determining" and insert -- determines --, therefor.

In column 10, line 23, in Claim 14, delete "first" and insert -- second --, therefor.

Signed and Sealed this
Thirtieth Day of October, 2012

David J. Kappos
*Director of the United States Patent and Trademark Office*